Patented Aug. 1, 1972

3,681,285
MANUFACTURE OF COLORLESS HIGH
MOLECULAR POLYPHENYLENE ETHERS
Herbert Naarmann and Herbert Willersinn, Ludwigshafen, Germany, assignors to Badische Anilin- & Soda-Fabrik Aktiengesellschaft, Ludwigshafen (Rhine), Germany
No Drawing. Filed Feb. 24, 1971, Ser. No. 118,546
Int. Cl. C08g 23/18, 23/24
U.S. Cl. 260—47 ET    7 Claims

ABSTRACT OF THE DISCLOSURE

A thermostable polyphenylene ether is obtained by oxidative coupling of a trisubstituted phenol and treatment of the polymeric product with a thiol.

Polyphenylene ethers obtained by the oxidative coupling of trisubstituted phenols in the presence of oxygen, an organic solvent and a copper/amine complex are acted upon at temperatures between 10° and 100° C. for at least 5 seconds by a thiol of the general formula $HSR^2$ where $R^2$ stands for a linear, branched or cyclic alkyl radical having from 2 to 20 carbon atoms, $$-CH_2-CH_2OH,\ -CH_2-\underset{CH_3}{\overset{H}{C}}-OH$$

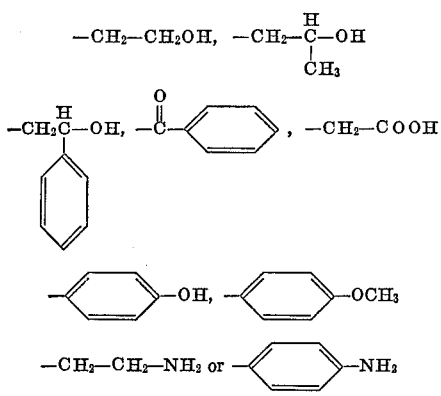

These high molecular weight polyphenylene ethers are suitable for the production of thermostable plastics and coatings.

---

The present invention relates to a process for the manufacture of colorless high molecular polyphenylene ethers by the action of thiols on polyphenylene ethers obtained by the oxidative coupling of tri-substituted phenols.

It is known that relatively high molecular weight polyphenylene ethers may be obtained, for example, from 2,6-dimethylphenol by oxidative coupling in the presence of copper(I)/pyridine complexes (cf. A. S. Hay, Advan. Polym. Sci., 4, 510 (1967); such polyphenylene ethers are purified by precipitating the reaction solution with a mixture of hydrochloric acid and methanol followed by reprecipitation from chloroform, and are used in the manufacture of thermostable coatings and synthetic resins.

In the process hitherto employed polymers are obtained which exhibit relatively high thermostability in atmospheres of nitrogen or other inert gases but which, in the presence of oxygen exhibit limited thermostability and undergo partial degradation, embrittlement and discoloration (cf. B. Vollmert, "Kunststoffe," 56, 689–691 (1966).

It is thus an object of the invention to provide high molecular weight polyphenylene ethers which are thermostable in the presence of atmospheric oxygen and exhibit no embrittlement or discoloration.

We have found that this object can be achieved in a process for the manufacture of colorless high molecular weight polyphenylene ethers obtained by the oxidative coupling of tri-substituted phenols of the general formula:

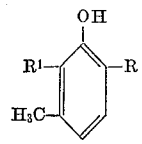

where R and $R^1$ may be identical or different and each stands for a chlorine or bromine atom or an alkyl group having 1 or 2 carbon atoms, optionally substituted by chlorine, bromine or cyano, in the presence of oxygen, an organic solvent and a copper/amine complex, by allowing the said polyphenylene ethers to be acted upon at temperatures of from 10° to 100° C. for at least 5 seconds by at least one thiol of the general formula $HSR^2$ where $R^2$ denotes a linear, branched or cyclic alkyl radical having from 2 to 20 carbon atoms, $$-CH_2-CH_2-OH,\ -CH_2\overset{H}{C}-OH,\ -CH_2-\overset{H}{\underset{CH_3}{C}}-OH$$

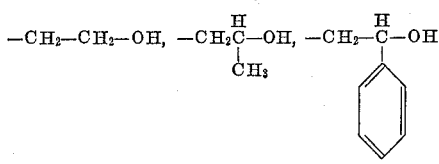

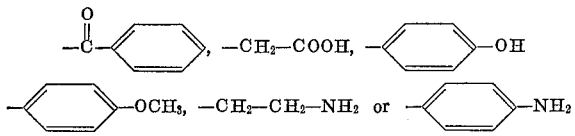

The process may be carried out particularly advantageously by adding the thiol to the polyphenylene oxides formed by oxidative coupling and to cause precipitation of the latter by the addition of water and/or methanol, which measure makes additional dissolution of the polymer in chloroform and reprecipitation from methanol unnecessary. This measure makes the process more economical because the additional and costly step of purification by precipitation is no longer necessary.

Further, the resulting polyphenylene oxide containing thio-ether groups contains no hydroperoxide groups unlike conventionally produced 2,6-dimethylpolyphenylene oxide which contains from 2 to 5 hydroperoxide groups per chain and is thus not resistant to prolonged heating and undergoes secondary conversions. In addition, the preferred thiols for use in the present invention offer further possibilities of subsequent reaction involving their reactive groups, for example polyphenylene oxides which have been modified by the —S—$CH_2$—$CH_2$—OH group may be additionally cross-linked with, say, polyisocyanates.

Suitable tri-substituted phenols of the general formula:

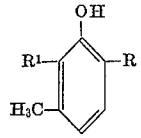

are, for example, 5-methyl-2,6-dialkylphenols such as 2,5,6-trimethylphenol, 2,5-dimethyl-6-ethylphenol, 2,6-diethyl-5-methylphenol, 2,6-di-(2-cyanoethyl)-5-methylphenol, the corresponding 5-methyl-2,6-dialkylphenols in which at least some of the alkyl groups are substituted by chlorine and/or bromine, 2-chloro-5-methyl-6-alkylphenols, 2-bromo-5-methyl-6-alkylphenols, 2,6-(dichloro- or dibromo)-5-methylphenols; 2,5,6-trimethylphenol (manufactured according to Smith et al., J. Org. Chem., vol. 4, 318 (1939)) is particularly suitable.

The oxidative coupling of these tri-substituted phenols may be carried out by the process described by A. S. Hay in Advan. Polym. Sci., 4, 510 (1967). Suitable organic solvents for this process are, for example, toluene, chlorobenzene and, preferably, pyridine, morpholine or nitrobenzene and mixtures thereof.

Suitable thiols for use in the process of the invention and having the general formula HSR² are linear, branched or cyclic alkyl mercaptans having from 2 to 20 carbon atoms in the alkyl group, for example no-dodecyl mercaptan or octyl mercaptan, and benzyl mercaptan or alkyl mercaptans in which the alkyl groups are substituted by hydroxyl groups, such as 1-mercaptoethanol-2, 1-mercaptopropanol-2, 1-mercaptobutanol-2 and 1-phenyl-2-mercaptoethanol. Other suitable thiols are thioglycollic acid, thiobenzoic acid, p-hydroxythiophenol, p-methoxythiophenol, 1-mercaptoethylamine-2, p-aminothiophenol and mixtures thereof. The preparation of such thiols is described in Houben-Weyl, "Methoden der Organischen Chemie," vol. 9, pp. 7–14, Georg-Thieme-Verlag, Stuttgart, 1955.

The process of the invention may be carried out in conventional reaction vessels such as flasks, kettles or stirred vessels.

It is advantageous to add the thiol to the solution of the polyphenylene ether as is obtained immediately after the oxidative coupling.

The amount of thiol which may be added to the polyphenylene ether solution in accordance with the present invention may be varied within wide limits. Usually, however, from 0.1 to 50 parts, preferably from 2.5 to 20 parts, by weight of thiol are added per 100 parts by weight of polyprhenylene ether.

The thiol should be allowed to act on the polymer solution for at least 5 seconds. It is generally unnecessary to allow the thiol to act for more than 30 minutes, a period of about 5–10 minutes being preferred. During this period the reaction solution should be at a temperature in the range 10–100° C. The polyphenylene oxide is then precipitated from the reaction solution by the addition of suitable precipitating agents such as water and/or methanol, after which it is filtered off and dried. There are thus obtained colorless high molecular weight polyphenylene ethers which are distinguished by improved thermostability and which exhibit neither embrittlement nor discoloration in the presence of atmopspheric oxygen. Moreover, it is possible to chemically modify these thiol-modified polyphenylene oxides at the sulfur atom, for example oxidation to —S=O and $SO_2$ groups, alkylation to sulfonium compounds, cross-linking, etherification, methylolation or saponification. The intrinsic viscosity ($\eta$) in dl./g. (measured in chloroform at 25° C.) of the polyphenylene ethers of the invention, which is a measure of their molecular weight, is in the range 0.4 to 1.0 dl./g.

The polyphenylene ethers obtained by the process of the invention are particularly suitable for the manufacture of thermostable plastics materials and coatings.

The invention is further illustrated by the following examples and comparative experiments in which parts and percentaegs are by weight, unless otherwise stated.

EXAMPLE 1

In a reaction vessel 15 parts of 2,5,6-trimethylphenol are dissolved in 200 parts of nitrobenzene and 70 parts of pyridine. 1 part of copper(I) chloride is added as catalyst. 20 parts by volume of oxygen is passed through the reaction solution in the course of 2 hours at 30° C. 5 parts of 2-mercaptoethanol is then added and the mixture is stirred for 30 seconds at 10° C. Precipitation is then effected with 1,000 parts of methanol. The filtered material is washed with 500 parts of methanol and dried in a vacuum dryer for 3 hours at 100° C. and 0.5 mm. Hg. There is thus obtained 15.2 parts of a colorless polymer having an intrinsic viscosity ($\eta$) (measured in chloroform at 25° C.) of 0.75 dl./g. and a sulfur content of 1.3%. When heated at 125° C. for 500 hours in the presence of air, the polymer exhibits no loss of weight and no embrittlement. When the polymer is cross-linked with hexamethylene diisocyanate, it gives clear films. In a test using potassium iodide in acetic acid no hydroperoxide groups could be detected.

COMPARATIVE EXAMPLE

Example 1 is repeated under the same conditions but without the addition of 2-mercaptoethanol. There is thus obtained 14.7 parts of an ochre-colored product having an intrinsic viscosity ($\eta$) of 0.77 dl./g. When heated at 125° C. for 500 hours in the presence of air, the polymer exhibits a loss of weight of 8% and the film used as sample becomes brittle. No cross-linking occurs when hexamethylene diisocyanate (HMD) is used. About 1 hydroperoxide group per polymer chain was found (equivalent to 2.5 mg. of precipitated iodine in a sample of polyphenylene oxide weighing 120 mg.).

EXAMPLES 2 TO 7

Example 1 is repeated except that the thiols and proportions thereof shown in the following table are used. The last column of the table lists the properties of the products obtained.

| Ex. | Thiol | Amt. (pts.) | Intr. visc. in CHCl³ at 25° C. (dl./g.) | Percent S | Properties |
|---|---|---|---|---|---|
| 2 | 1-methyl-2-mercaptoethanol. | 5 | 0.74 | 1.2 | Free from hydroperoxide; crosslinkable with HMD.¹ |
| 3 | 1-phenyl-2-mercaptoethanol. | 3 | 0.76 | 0.9 | Do. |
| 4 | Thiobenzoic acid. | 10 | 0.75 | 1.3 | Free from hydroperoxide; saponifiable with aqueous HCl with formation of —SH groups. |
| 5 | Thioglycollic acid. | 2 | 0.77 | 0.6 | Free from hydroperoxide; crosslinkable via the carboxyl group. |
| 6 | p-Methoxythiophenol. | 7 | 0.76 | 0.9 | Free from hydroperoxide; methylolatable and then crosslinkable. |
| 7 | n-Dodecyl mercaptan. | 10 | 0.73 | 0.7 | Free from hydroperoxide; formation of sulfoxide in atm. oxygen at 125° C. |

¹HMD=hexamethylene diisocyante.

EXAMPLE 8

Example 1 is repeated except that the starting monomer used is 2,6-dichloro-5-methylphenol, obtained by the process described by Huston et al. in J. Am. Chem. Soc., Vol. 57, 2176 (1935). There is thus obtained 14.3 parts of a polymer without hydroperoxide groups and having an intrinsic viscosity ($\eta$) in m-cresol at 25° C. of 0.5 dl./g. The sulfur content is 1.5%. The polymer may be cross-linked with HMD, unlike a polymer obtained under the same conditions as described in the comparative example but without the addition of the thiol. Such a product is not cross-linkable and contains approximately 3 hydroperoxide groups per chain.

We claim:
1. A process for the manufacture of colorless high molecular weight polyphenylene ethers obtained by the oxidative coupling of tri-substituted phenols of the general formula:

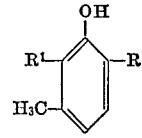

where R and R¹ may be identical or different and each stands for a chlorine or bromine atom or an alkyl group having 1 or 2 carbon atoms, optionally substituted by chlorine, bromine or cyano, in the presence of oxygen, an organic solvent and a copper/amine complex, wherein the said polyphenylene ethers are acted upon at temperatures of from 10° to 100° C. for at least 5 seconds by a thiol of the general formula HSR² where R² denotes a linear, branched or cyclic alkyl radical having from 2 to 20 carbon atoms,

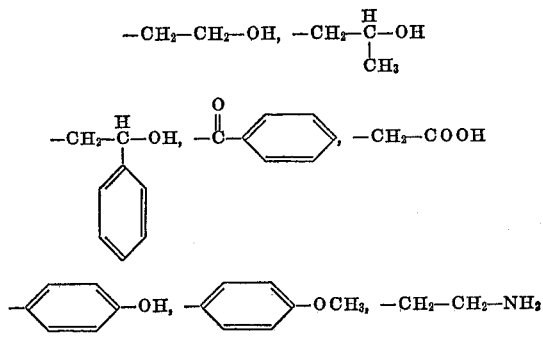

or

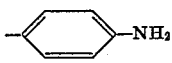

2. A process as claimed in claim 1 wherein the thiol of the general formula HSR² defined in claim 1 is used in an amount of from 0.1 to 50 parts by weight per 100 parts by weight of polyphenylene ether.

3. A process as claimed in claim 1 wherein the thiol of the general formula HSR² defined in claim 1 is used in an amount of from 2.5 to 20 parts by weight per 100 parts by weight of polyphenylene ether.

4. A process as claimed in claim 1 wherein the thiol is added to the solution of the polyphenylene ether as is obtained immediately after the oxidative coupling.

5. A process as claimed in claim 1 wherein the thiol is allowed to act upon the polyphenylene ether for from 5 to 10 minutes.

6. A process as claimed in claim 1 wherein the polyphenylene ether used is that obtained by the oxidative coupling of 2,5,6-trimethylphenol.

7. A process as claimed in claim 1 wherein the polyphenylene ether used is that obtained by the oxidative coupling of 2,6-dichloro-5-methylphenol.

References Cited

UNITED STATES PATENTS

| | | |
|---|---|---|
| 3,375,228 | 3/1968 | Holoch et al. |
| 3,379,875 | 4/1968 | Holoch. |
| 3,388,095 | 6/1968 | Huntjens. |
| 3,402,143 | 9/1968 | Hay. |
| 3,546,170 | 12/1970 | Hay. |

MELVIN GOLDSTEIN, Primary Examiner

PO-1050
(5/69)

UNITED STATES PATENT OFFICE
CERTIFICATE OF CORRECTION

Patent No. 3,681,285        Dated August 1, 1972

Inventor(s) Herbert Naarmann and Herbert Willersinn

It is certified that error appears in the above-identified patent and that said Letters Patent are hereby corrected as shown below:

Column 1, line 8, insert -- Claims priority, application Germany, March 3, 1970, P 20 09 750.1 --.

Column 2, line 38, "Further," should read -- Furthermore, --.

Signed and sealed this 27th day of November 1973.

(SEAL)
Attest:

EDWARD M. FLETCHER, JR.
Attesting Officer

RENE D. TEGTMEYER
Acting Commissioner of Patents